United States Patent
Ma et al.

(10) Patent No.: US 10,958,165 B1
(45) Date of Patent: Mar. 23, 2021

(54) HIGH-CONVERSION-EFFICIENCY RECONFIGURABLE SERIES-PARALLEL SWITCHED-CAPACITOR VOLTAGE CONVERTER

(71) Applicant: Southchip Semiconductor Technology (Shanghai) Co., Ltd., Shanghai (CN)

(72) Inventors: Jun Ma, Shanghai (CN); Jianjian Bian, Shanghai (CN)

(73) Assignee: SOUTHCHIP SEMICONDUCTOR TECHNOLOGY(SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/994,694

(22) Filed: Aug. 17, 2020

(30) Foreign Application Priority Data

May 15, 2020 (CN) .......................... 202010410105.X

(51) Int. Cl.
   *H02M 3/07* (2006.01)
(52) U.S. Cl.
   CPC .................................... *H02M 3/07* (2013.01)
(58) Field of Classification Search
   CPC ............ H02M 3/00; H02M 3/02; H02M 3/04; H02M 3/06; H02M 3/07; H02M 3/073; H02M 2003/071; H02M 2003/072; H02M 2003/075; H02M 2003/076; H02M 2003/077; H02M 2003/078
   See application file for complete search history.

(56) References Cited

U.S. PATENT DOCUMENTS

| 2007/0139982 A1* | 6/2007 | Ueno ..................... H02M 3/07 363/59 |
| 2020/0144909 A1* | 5/2020 | Baek ..................... H02M 3/156 |
| 2020/0350821 A1* | 11/2020 | Cannillo ............. H02M 3/1584 |

OTHER PUBLICATIONS

John F. Dickson et al., On-Chip High-Voltage Generation in MNOS Integrated Circuits Using an Improved Multiplier Technique, IEEE Journal of Solid-State Circuits, Jun. 1976, pp. 374-378, vol. SC-11, No. 3.

* cited by examiner

Primary Examiner — Diana J. Cheng
(74) Attorney, Agent, or Firm — Bayramoglu Law Offices LLC

(57) ABSTRACT

A high-conversion-efficiency reconfigurable series-parallel switched-capacitor voltage converter includes N−1 control units and is capable of realizing a voltage conversion ratio in a range from 1:1 to N:1 between a second conversion terminal and a first conversion terminal. When the voltage conversion ratio between the first conversion terminal and the second conversion terminal of the reconfigurable series-parallel switched-capacitor voltage converter is Nx:1, the N−1 control units are divided into k+1 control modules. k control switch tubes are configured to respectively correspond to the preceding k control modules. Each one of the preceding k control modules comprises m control units, and the last control module comprises t control units; m=Nx−1; k and t satisfy N−1=m×k+t; k and m are both 0 or are both positive integers; and t is as small as possible.

6 Claims, 14 Drawing Sheets

N=3, m=2, k=1, t=0

N=3, m=2, k=1, t=0

N=4, m=1, k=3, t=0

N=4, m=0, k=0, t=3

HIGH-CONVERSION-EFFICIENCY RECONFIGURABLE SERIES-PARALLEL SWITCHED-CAPACITOR VOLTAGE CONVERTER

CROSS-REFERENCE TO RELATED APPLICATION

This application is based upon and claims priority to Chinese Patent Application No. 202010410105.X, filed on May 15, 2020, the entire contents of which are incorporated herein by reference.

BACKGROUND OF THE INVENTION

(1) Field of the Invention

The present invention relates to the technical field of power supply systems, and more particularly, to a high-conversion-efficiency reconfigurable series-parallel switched-capacitor voltage converter.

(2) Description of Related Art

With the establishment of data centers and the popularization of consumer electronics capable of being quickly charged, the energy density of a voltage converter is constantly improved. A higher energy density necessarily requires a higher conversion efficiency. In the new application fields, a conventional charge pump topology is widely used. A charge pump is a switched-capacitor voltage converter. Compared with other voltage converter topologies, the charge pump has the advantageous feature that it is provided only with a capacitive energy storage device, but no inductive energy storage device. Owing to the feature, the charge pump has two advantages: first, the current of the charge pump can become zero instantaneously without a magnetic energy storage device. Therefore, the charge pump is naturally a soft switch, and the switching loss of the charge pump is remarkably reduced. Second, since no magnetic energy storage device is disposed, the charge pump has no switch-on heat loss caused by the magnetic energy storage device. Because of these advantages, the charge pump can realize a higher conversion efficiency.

FIG. 1 is a common prior art 2:1 202010410105.X series-parallel charge pump. Four power tubes Q1-Q4 are alternately switched on according to a 50% duty ratio; at one phase, Q1 and Q3 are switched on, and Q2 and Q4 are switched off; and at the next phase, Q2 and Q4 are switched on, and Q1 and Q3 are switched off. FIG. 2 shows the operating situation of a CFLY capacitor at two phases. Under an ideal situation with no load, a voltage of the CFLY capacitor is equal to a VY voltage, and is equal to a half of a VX voltage.

If the 2:1 series-parallel charge pump is generalized to an N:1 series-parallel charge pump, as shown in FIGS. 3 and 4, at one phase, N−1 capacitors are connected in series between the VX voltage and the VY voltage; and at the other phase, the N−1 capacitors are connected in parallel between the VY voltage and the ground. Under an ideal situation with no load, the voltages of all the N−1 capacitors are equal, and are equal to the VY voltage; the VX voltage is equal to the sum of the voltages of the N−1 capacitors and the VY voltage, that is, the VX voltage is equal to N*VY voltage.

It should be specially noted that source terminal voltages of the power tubes in FIG. 3 are different, and that a logic signal to the ground needs level conversion to drive the power tubes. In order to facilitate description, FIG. 3 omits level conversion, and it is considered that when a logic seen at a gate electrode of the power tube is high, the power tube is switched on, and that when the logic seen at the gate electrode of the power tube is low, the power tube is switched off. INV in FIG. 3 is a phase inverter; the logics in front and back of the phase inverter are reverse. A clock signal is a square wave signal with a 50% duty ratio.

Compared with other charge pump structures, such as the Dickson charge pump (J. F. Dickson, On-Chip high-voltage generation in NMOS integrated circuits using an improved voltage multiplier technique, IEEE Journal of Solid-State Circuits, vol. 11, no. 3, pp. 374-378, 1976), the series-parallel charge pump has the obvious advantage that the voltages of the N−1 CFLY capacitors of the Dickson charge pump are respectively one time, two times, . . . , and N−1 times that of the VY voltage, and the voltages of all the CFLY capacitors of the series-parallel charge pump are the VY voltage. The advantage has an extremely high commercial value in practical use. Nowadays, a system generally desires the voltages of the CFLY capacitors not to exceed the VY voltage in practical use; therefore, the series-parallel charge pump is an optimum selection (the voltages of the CFLY capacitors are all the VY voltage). In addition, the VX voltage of a series-parallel charge pump system can be three times, two times or one time that of the VY voltage, for example, the 3:1 series-parallel charge pump as shown in FIG. 5. When the VX voltage is three times that of the VY voltage, the 3:1 charge pump normally and efficiently operates, as shown in FIG. 5A; when the VX voltage is two times that of the VY voltage, the charge pump can still operate, as shown in FIG. 5B; and when the VX voltage is one time that of the VY voltage, the charge pump is as shown in FIG. 5C. However, in a circuit of the conventional series-parallel charge pump, when the VX voltage is two times that of VY voltage, only CFLY, Q3, Q1_A, Q1_B, Q1_C, and Q2_A are utilized, and CFLY2, Q2_B, and Q2_C barely have an effect during charge transfer, which causes device wasting. More importantly, the voltage conversion efficiency is greatly reduced compared with the other two situations, and the heat loss is too high such that a system requirement cannot be satisfied.

BRIEF SUMMARY OF THE INVENTION

To overcome the defects of low voltage conversion efficiency and high heat loss in the above conventional series-parallel charge pump system, the present invention provides a reconfigurable series-parallel switched-capacitor voltage converter. The converter has a high conversion efficiency, can utilize each device in a circuit to the most extent, improves the voltage conversion efficiency, and reduces the heat loss.

The technical solution of the present invention is:

A high-conversion-efficiency reconfigurable series-parallel switched-capacitor voltage converter, comprising N−1 control units and a control switch tube, N being a positive integer greater than 1.

A j-th control unit comprises a capacitor, a first NMOS transistor, a second NMOS transistor, and a third NMOS transistor, j being a positive integer and j∈[1,N−1].

A drain electrode of the first NMOS transistor is connected to one terminal of the capacitor, and acts as an input terminal of the j-th control unit. A source electrode thereof is connected to a first conversion terminal of the reconfigurable series-parallel switched-capacitor voltage converter.

A drain electrode of the second NMOS transistor is connected to an input terminal of a (j+1)-th control unit, and a source electrode thereof is connected to a drain electrode of the third NMOS transistor and the other terminal of the capacitor. A source electrode of the third NMOS transistor is connected to a reference ground.

A drain electrode of the second NMOS transistor of a (N−1)-th control unit is connected to the first conversion terminal of the reconfigurable series-parallel switched-capacitor voltage converter.

The N−1 control units are divided into k+1 control modules, k being a positive integer not greater than N−1; each one of the preceding k control modules comprises m control units, and the last control module comprises t control units, k, m and t being all non-negative integers.

The reconfigurable series-parallel switched-capacitor voltage converter further comprises k−1 control switch tubes; totally k control switch tubes respectively correspond to the preceding k control modules, wherein a drain electrode of an i-th control switch tube is connected to a second conversion terminal of the reconfigurable series-parallel switched-capacitor voltage converter, and a source electrode thereof is connected to an input terminal of a first control unit in a corresponding i-th control module, i being an positive integer and i∈[1,M].

A gate electrode of the i-th control switch tube and a gate electrode of the second NMOS transistor in the corresponding i-th control module are connected to a clock signal of the i-th control module; gate electrodes of the first NMOS transistor and the third NMOS transistor in the i-th control module are connected to a reverse-phase signal of the clock signal of the i-th control module.

The clock signal of the i-th control module and the clock signal of the (i+1)-th control module are reverse-phase signals; the clock signal of a first control module is the clock signal of the series-parallel switched-capacitor voltage converter.

A gate electrode of the second NMOS transistor in the last control module is connected to a low level; gate electrodes of the first NMOS transistor and the third NMOS transistor in the last control module are connected to a high level.

The reconfigurable series-parallel switched-capacitor voltage converter can realize a voltage conversion ratio in a range from 1:1 to N:1 between the second conversion terminal and the first conversion terminal; and when the voltage conversion ratio between the first conversion terminal and the second conversion terminal of the reconfigurable serial-parallel switched-capacitor voltage converter is Nx:1, Nx is a positive integer and Nx∈[1,N]; m=Nx−1; k and t satisfy N−1=m×k+t; k and m are both 0 or are both positive integers; and t is as small as possible.

Specifically, P reconfigurable series-parallel switched-capacitor voltage converters are cascaded to form a cascaded master switched-capacitor voltage converter, P being a positive integer greater than 1; each cascaded reconfigurable series-parallel switched-capacitor voltage converter acts as a sub-switched-capacitor voltage converter; an input terminal of a p-th sub-switched-capacitor voltage converter is connected to an output terminal of a (p−1)-th sub-charge pump; an input terminal of a first sub-switched-capacitor voltage converter acts as an input terminal of the cascaded master switched-capacitor voltage converter; an output terminal of the p-th sub-switched-capacitor voltage converter acts as an output terminal of the cascaded master switched-capacitor voltage converter; p is a positive integer and p∈[1,P].

The p-th sub-switched-capacitor voltage converter comprises Np−1 control units, Np being a positive integer greater than 1; the voltage conversion ratio between the output terminal and the input terminal of the p-th sub-switched-capacitor voltage converter is $L_p^{a_p}:1$, $L_p \in [1,N_p]$; when the p-th sub-switched-capacitor voltage converter treats the first conversion terminal as an input terminal, and treats the second conversion terminal as an output terminal, $a_p=1$; when the p-th sub-switched-capacitor voltage converter treats the second conversion terminal as an input terminal, and treats the first conversion terminal as an output terminal, $a_p=-1$; and the voltage conversion ratio between the output terminal and the input terminal of the cascaded master switched-capacitor voltage converter is L:1, $L=L_1^{a_1} \times L_2^{a_2} \times \ldots \times L_p^{a_p}$.

Specifically, Q first switched-capacitor voltage converters having the same voltage conversion ratio are used in parallel connection; the clock signals of two adjacent first switched-capacitor voltage converters have a phase difference of 360°/Q; and each first switched-capacitor voltage converter can select to adopt the reconfigurable series-parallel switched-capacitor voltage converter or the cascaded master switched-capacitor voltage converter.

Specifically, the clock signal of the series-parallel switched-capacitor voltage converter is a square wave signal with a 50% duty ratio.

The present invention has the following beneficial effects: the present invention utilizes each device in a circuit to the most extent, reduces the wasting of the device, and solves the problem of low operating efficiency under certain voltage conversion ratios in the conventional N:1 series-parallel charge pump, thus improving the voltage conversion efficiency, and reducing the heat loss. in addition, the present invention provides a use solution of cascading or connecting charge pumps in parallel, thus improving the design flexibility, and improving the current performance of the charge pump.

DETAILED DESCRIPTION OF THE INVENTION

Figure 1:
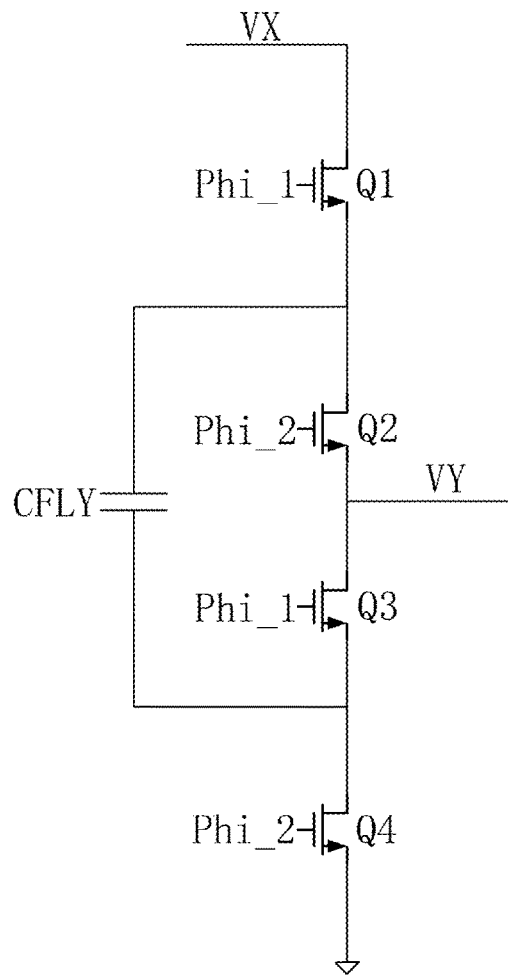
FIG. 1 is a structural schematic diagram of a conventional 2:1 series-parallel charge pump.
Figure 2:
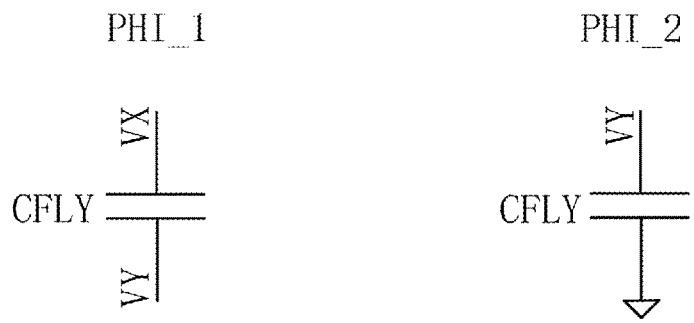
FIG. 2 is an operating schematic diagram of the conventional 2:1 series-parallel charge pump under two phases.
Figure 3:
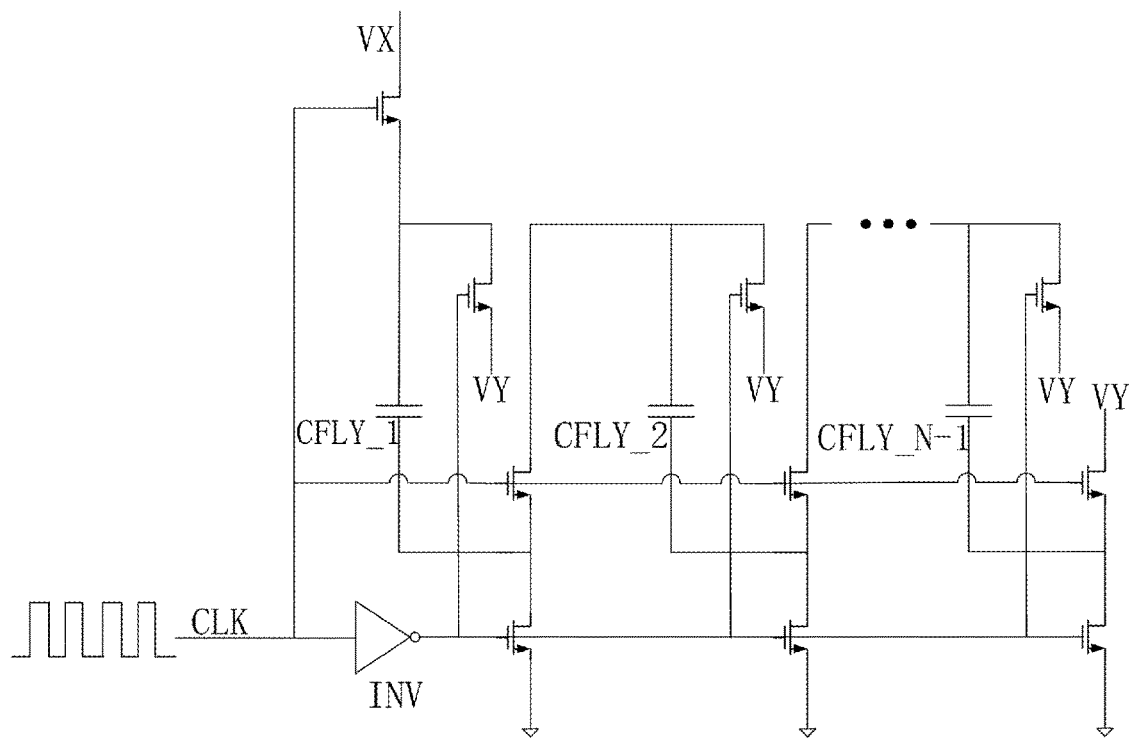
FIG. 3 is a structural schematic diagram of an N:1 series-parallel charge pump (note: a source terminal of a power tube is connected to different levels; and level conversion needs to be performed on a logic signal during actual drive; herein, the level conversion is omitted; a high logic represents that the power tube is switched on, and a low logic represents that the power tube is switched off)
Figure 4:
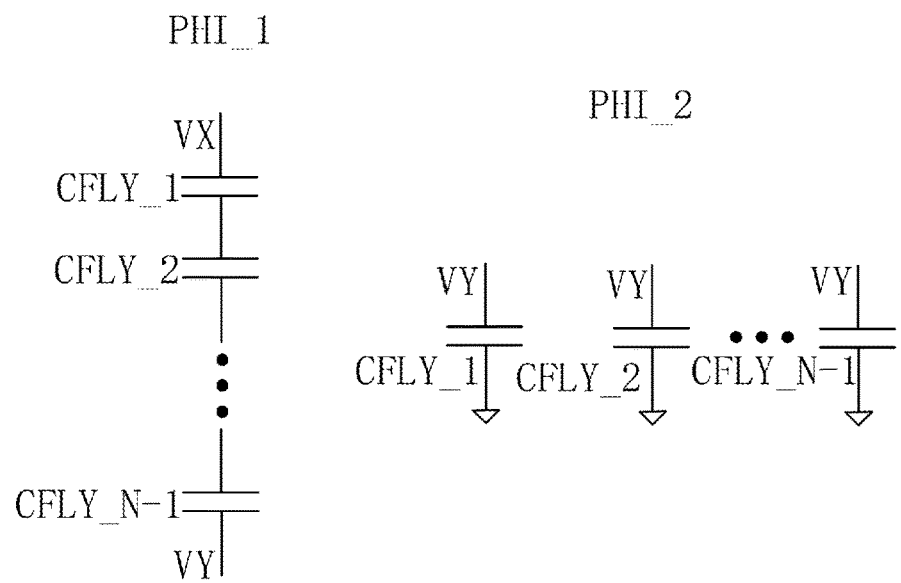
FIG. 4 is an operating schematic diagram of the N:1 series-parallel charge pump under two phases.
Figure 5A:
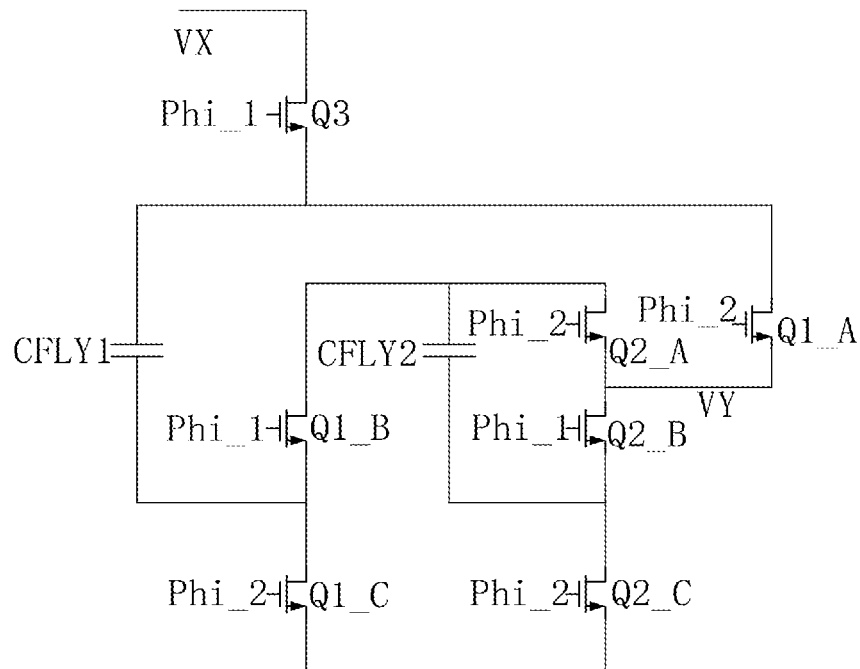
FIG. 5A is an operating principle diagram when a conventional 3:1 series-parallel charge pump realizes a voltage conversion ratio of 3:1 between a second conversion terminal and a first conversion terminal.
Figure 5B:
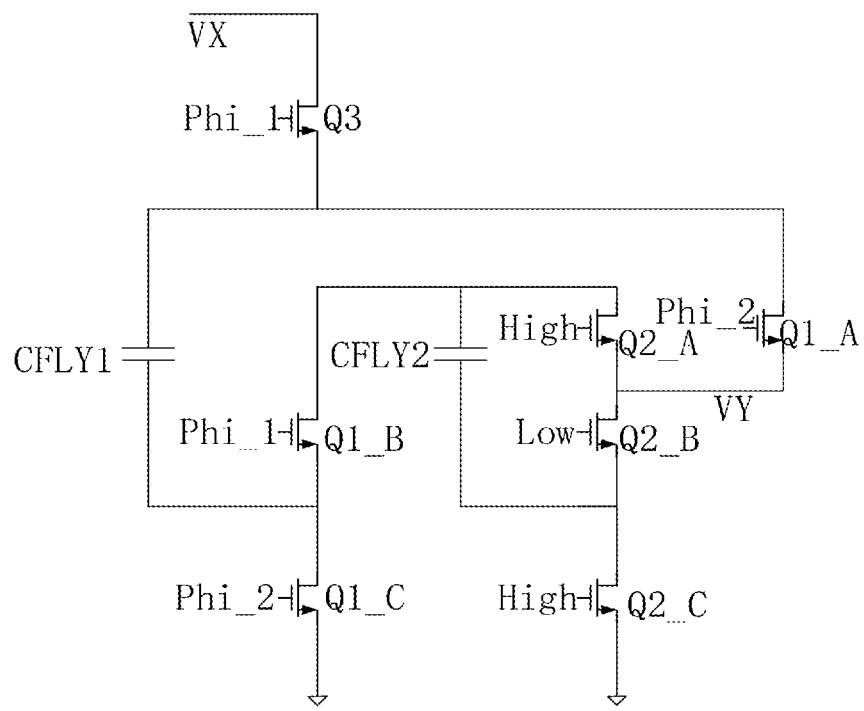
FIG. 5B is an operating principle diagram when the conventional 3:1 series-parallel charge pump realizes a voltage conversion ratio of 2:1 between the second conversion terminal and the first conversion terminal.
Figure 5C:
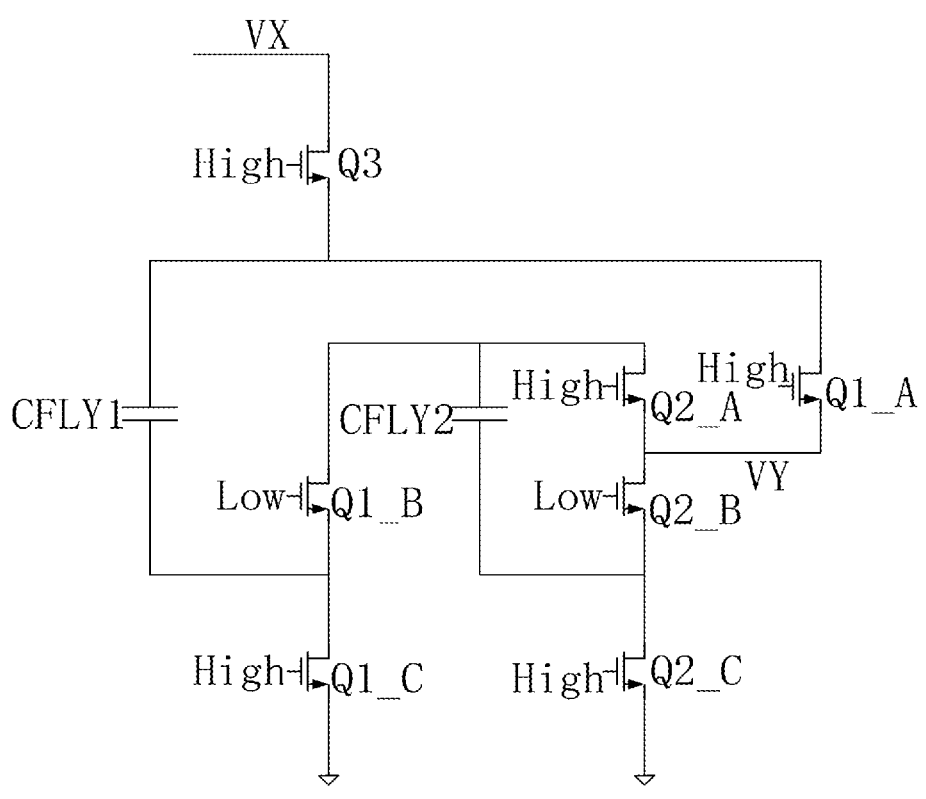
FIG. 5C is an operating principle diagram when the conventional 3:1 series-parallel charge pump realizes a voltage conversion ratio of 1:1 between the second conversion terminal and the first conversion terminal.

The technical solution of the present invention will be described in detail in combination with the drawings and specific embodiments.

The present invention provides a high-conversion-efficiency reconfigurable series-parallel switched-capacitor voltage converter, being an N:1 series-parallel charge pump, and capable of realizing a voltage conversion ratio in a range from 1:1 to N:1 between a second conversion terminal and a first conversion terminal, N being a positive integer greater than 1. When the first conversion terminal acts as an input terminal and the second conversion terminal acts as an output terminal, a voltage at the first conversion terminal can be improved by 1 to N times, and is then outputted from the second conversion terminal; and when the second conversion terminal acts as an input terminal and the first conversion terminal acts as an output terminal, a voltage at the second conversion terminal can be reduced by 1 to 1/N times, and is then outputted from the first conversion terminal.

An N:1 series-parallel charge pump comprises totally N−1 control units; in the present invention, the N−1 control units are divided into k+1 control modules; and each one of the preceding k control modules corresponds to one control switch tube. Each one of the preceding k control modules comprises m control units, and the last control module comprises t control units, k, m and t being all non-negative integers. The specific group division situation depends on the voltage conversion ratio between the second conversion terminal and the first conversion terminal; when the reconfigurable serial-parallel switched-capacitor voltage converter provided by the present invention needs to realize a Nx: 1 voltage conversion ratio between the first conversion terminal and the second conversion terminal, Nx is a positive integer and Nx∈[1,N]; m is set to be m=Nx−1; the values of k and t satisfy N−1=m×k+t; k and m are both 0 or are both positive integers; and t selects the minimum value in all possible cases. Description is given hereafter in combination with FIGS. 6, 8, 9, and 10.

Figure 6A:
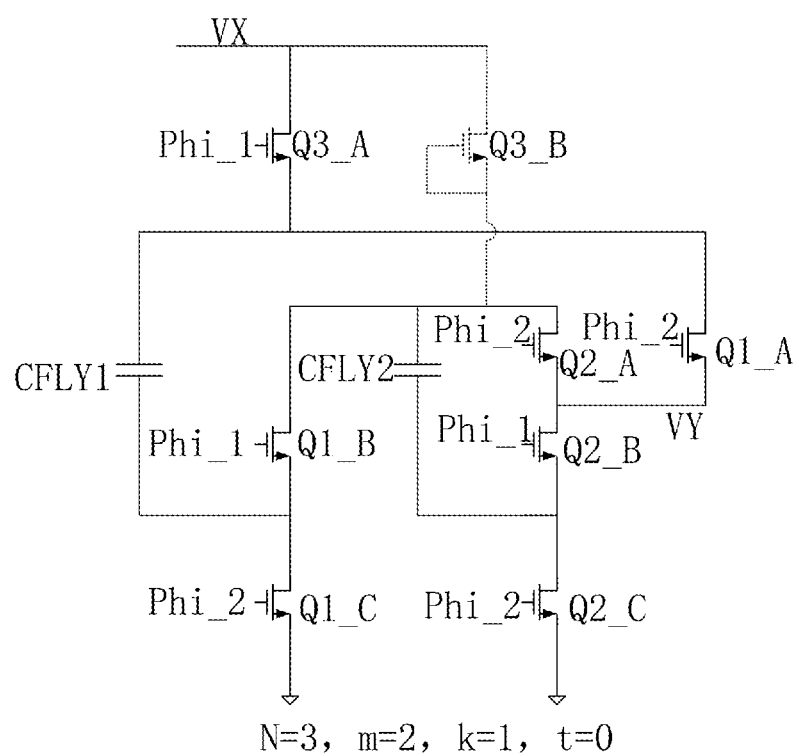
FIG. 6A is an operating principle diagram when a 3:1 series-parallel switched-capacitor voltage converter provided by the present invention realizes a voltage conversion ratio of 3:1 between the second conversion terminal and the first conversion terminal.
Figure 6B:
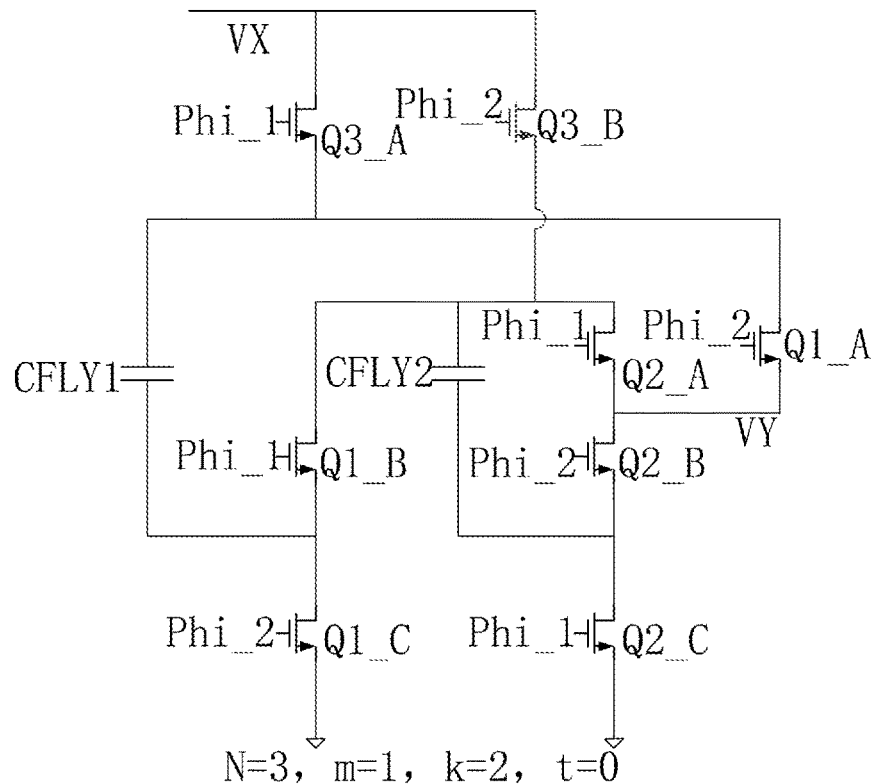
FIG. 6B is an operating principle diagram when the 3:1 series-parallel switched-capacitor voltage converter provided by the present invention realizes a voltage conversion ratio of 2:1 between the second conversion terminal and the first conversion terminal.
Figure 6C:
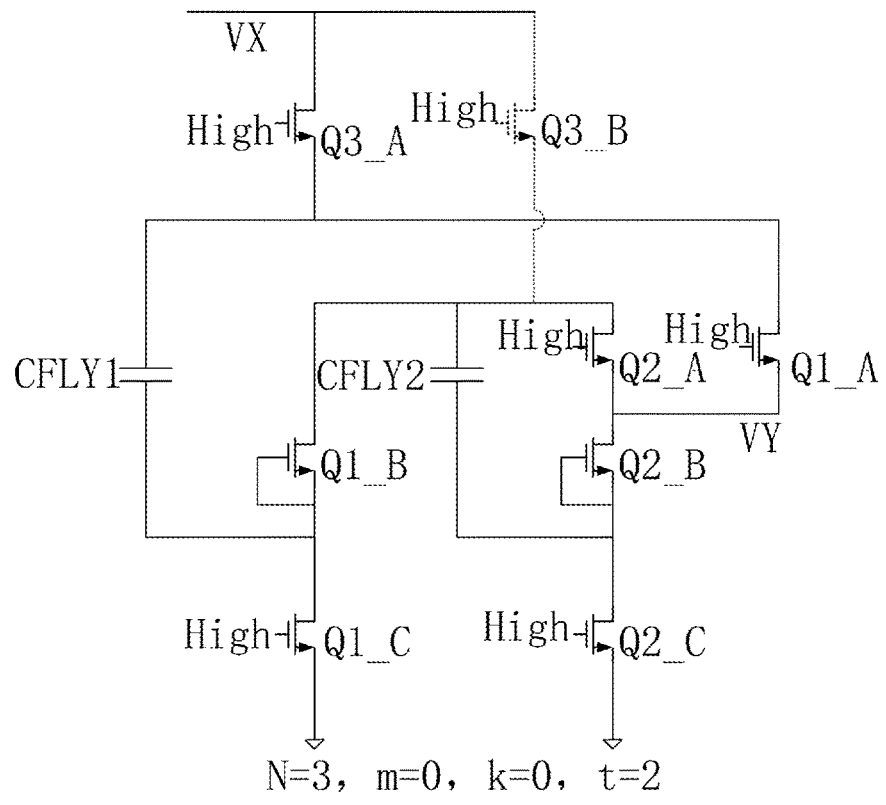
FIG. 6C is an operating principle diagram when the 3:1 series-parallel switched-capacitor voltage converter provided by the present invention realizes a voltage conversion ratio of 1:1 between the second conversion terminal and the first conversion terminal.

As shown in FIG. 6, N=3, and each one comprises two control units; the first control unit comprises a capacitor CFLY1, a first NMOS transistor Q1_A, a second NMOS transistor Q1_B, and a third NMOS transistor Q1_C; a drain electrode of the first NMOS transistor Q1_A is connected to one terminal of the capacitor CFLY1, and acts as an input terminal of the first control unit; a source electrode of the first NMOS transistor Q1_A is connected to the first conversion terminal VY of the series-parallel switched-capacitor voltage converter; a drain electrode of the second NMOS transistor Q1_B is connected to an input terminal of the second control unit, namely a drain electrode of the first NMOS transistor Q2_A in the second control unit; a source electrode of the second NMOS transistor Q1_B is connected to a drain electrode of the third NMOS transistor Q1_C and the other terminal of the capacitor CFLY1; and a source electrode of the third NMOS transistor Q1_C is connected to a reference ground. If a source terminal of a power tube is connected to different reference ground levels, then level conversion needs to be performed on a logic signal according to the different reference ground levels during actual drive; herein, the level conversion is omitted; a high logic represents that the power tube is switched on, and a low logic represents that the power tube is switched off. The second control unit comprises a capacitor CFLY2, a first NMOS transistor Q2_A, a second NMOS transistor Q2_B, and a third NMOS transistor Q2_C; a drain electrode of the first NMOS transistor Q2_A is connected to one terminal of the capacitor CFLY1, and is connected, as an input terminal of the second control unit, to the drain electrode of the second NMOS transistor Q1_B in the first control unit; a source electrode of the first NMOS transistor Q2_A is connected to the first conversion terminal VY of the series-parallel switched-capacitor voltage converter; a drain electrode of the second NMOS transistor Q2_B is connected to the first conversion terminal VY of the series-parallel switched-capacitor voltage converter; a source electrode of the second NMOS transistor Q2_B is connected to a drain electrode of the third NMOS transistor Q2_C and the other terminal of the capacitor CFLY2; and a source electrode of the third NMOS transistor Q2_C is connected to the reference ground.

Wherein FIG. 6A realizes a voltage conversion ratio of 3:1 between the second conversion terminal and the first conversion terminal; Nx=3, and m=Nx−1=2, which denotes that each one of the preceding k control modules comprises two control units; in addition, the condition N−1=m×k+t, namely 2=2×k+t, needs to be satisfied, and k and m can only be both 0 or both positive integers; therefore, k can only be 1, and t is 0; that is, the two control units of the 3:1 series-parallel switched-capacitor voltage converter are divided into two control modules; the first control module comprises two control units, and the last control module does not comprise control unit; and one control switch tube is required. FIG. 6B realizes a voltage conversion ratio of 2:1 between the second conversion terminal and the first conversion terminal: Nx=2, and m=Nx−1=1, which denotes that each one of the preceding k control modules comprises one control unit; in addition, the condition N−1=m×k+t, namely 2=1×k+t, needs to be satisfied, and k and m can only be both 0 or both positive integers; therefore, k can be 1 or 2, and correspondingly t can be 1 or 0; furthermore, t should be as small as possible; therefore, t=0, k=2, that is, the two control units of the 3:1 series-parallel switched-capacitor voltage converter are divided into three control modules; the preceding two control modules respectively comprise one control unit, and the last control module does not comprise control unit; and two control switch tubes are required. FIG. 6C realizes a voltage conversion ratio of 1:1 between the second conversion terminal and the first conversion terminal; Nx=1, and m=Nx−1=0, which denotes that each one of the preceding k control modules comprises zero control unit; in addition, the condition N−1=m×k+t, namely 2=0×k+t, needs to be satisfied, and k and m can only be both 0 or both positive integers; therefore, k can only be 0, and t is 2; that is, the two control units of the 3:1 series-parallel switched-capacitor voltage converter are divided into two control modules; the first control module does not comprise control unit, and the last control module comprises two control units; and no control switch tube is required.

Therefore, two control switch tubes Q3_A and Q3_B can be directly disposed; when the voltage conversion ratio between the second conversion terminal and the first conversion terminal is 3:1, Q3_A is normally used, and a gate electrode and a source electrode of the Q3_B are shorted, enabling the Q3_B to be normally closed; when the voltage conversion ratio between the second conversion terminal and the first conversion terminal is 2:1, Q3_A and Q3_B are both normally used; and when the voltage conversion ratio between the second conversion terminal and the first conversion terminal is 1:1, Q3_A and Q3_B are normally open. Phi_1 and Phi_2 are two reverse phases of a clock signal CLK.

Compared with the conventional 3:1 series-parallel switched-capacitor voltage converter provided with a control switch tube Q3_A, the present embodiment further adds a control switch tube Q3_B, and solves the problem of low efficiency when the conventional 3:1 series-parallel switched-capacitor voltage converter operates under a voltage conversion ratio of 2:1. As shown by the circuit in FIG. 6B, when the voltage conversion ratio of the switched-capacitor voltage converter is 2:1, the capacitors and the power tubes are all fully utilized. To be specific, at a first phase (the power tube the gate phase of which is Phi_1 is switched on, and the power tube the gate phase of which is Phi_2 is switched off), the capacitor CFLY1 is connected between the second conversion terminal VX and the first conversion terminal VY via Q3_A, Q2_B and Q2_A, and the capacitor CFLY2 is connected between the first conversion terminal VY and the ground via Q2_A and Q2_C; and at a second phase (the power tube the gate phase of which is Phi_2 is switched on, and the power tube the gate phase of which is Phi_1 is switched off), the capacitor CFLY1 is connected between the first conversion terminal VY and the ground via Q1_C and Q1_A, and the capacitor CFLY2 is connected between the second conversion terminal VX and the first conversion terminal VY via Q3_B and Q2_B. In the solution of the present embodiment, the two capacitors CFLY1 and CFLY2 both transfer charges; the power tubes are all fully utilized; the operating phases of the two capacitors CFLY1 and CFLY2 have a 180 degree difference, thus a current flowing through the second conversion terminal (the VX terminal) of the 3:1 series-parallel switched-capacitor voltage converter is continuous; if the two capacitors CFLY1 and CFLY2 are equal, then when the same current is transferred, a current flowing through each power tube in the solution of the present embodiment is half of a current flowing through the operating power tube in the conventional solution (only the CFLY1 is utilized, and the CFLY2 is idle). In the conventional solution, the VX terminal has current at one phase, and has no current at the other phase; a load jump from a heavy current to a small current or from a small current to a heavy current occurs in each period: an input power supply connected to the VX terminal requires time to make response to the load jump; therefore, at the instant of a current jump, a great ripple would be generated because the input power supply cannot make response in time; in order to avoid the ripple, a large input capacitor needs to be added to filter the ripple. In the solution of the present invention, the current is continuous; therefore, the requirements for the input power supply and the input capacitor are reduced a lot. In addition, the continuous current at the VX terminal in the present invention can improve a performance of an EMI (electromagnetically compatible); in practical, connected lines on a board form a current loop; if the current is discontinuous, then a great di/dt would be generated; the changing current would generate a changing magnetic field on the current loop; the changing magnetic field enables the adjacent current loop to induce a changing current, so as to generate interference; if a system comprises a electromagnetic field sensitive circuit (such as a radio, a broadcast, a mobile phone communication, a weak signal inductor and the like), then an electromagnetic field would generate strong interference to the circuit. The present invention can generate a continuous current, and a small current change results in a small di/dt, thus greatly improving an electromagnetic environment, and improving the performance of the EMI.

For the 3:1 series-parallel switched-capacitor voltage converter, it is assumed that $R_{Q3\_A}+R_{Q1\_B}+R_{Q2\_A}+R_{Q1\_C}+R_{Q1\_A}>R_{Q3\_B}+R_{Q2\_A}+R_{Q2\_B}+R_{Q2\_C}$. The assumption complies with the design of a normal switched-capacitor voltage converter.

When the voltage conversion ratio is 2:1, A switch-on power loss of the conventional solution is: $P_{loss\_conventional}=IY^2*(R_{Q3\_A}+R_{Q1\_B}+R_{Q2\_A}+R_{Q1\_C}+R_{Q1\_A})$.

A switch-on power loss of the solution in the present embodiment is: $P_{loss\_proposed}=(IY/2)^2*[(R_{Q3\_A}+R_{Q1\_B}+R_{Q2\_A}+R_{Q1\_C}+R_{Q1\_A})+(R_{Q3\_B}+R_{Q2\_A}+R_{Q2\_B}+R_{Q2\_C})]<(IY/2)^2*[(R_{Q3\_A}+R_{Q1\_B}+R_{Q2\_A}+R_{Q1\_C}+R_{Q1\_A})+(R_{Q3\_A}+R_{Q1\_B}+R_{Q2\_A}+R_{Q1\_C}+R_{Q1\_A})]=P_{loss\_conventional}/2$.

Wherein IY is the current of the VY terminal; $R_{Q3\_A}$ and $R_{Q1\_B}$ are switch-on resistances of the corresponding MOS transistors.

Therefore, in the solution of the present embodiment, by means of adding a power tube, the loss of the switched-capacitor voltage converter is reduced by half when operating at 2:1; compared with the reduced loss, the cost of the added power tube is negligible. The present embodiment has another advantage that the current at the VX terminal retains continuous. The conventional solution has no current at one phase of the VX terminal.

Figure 7:
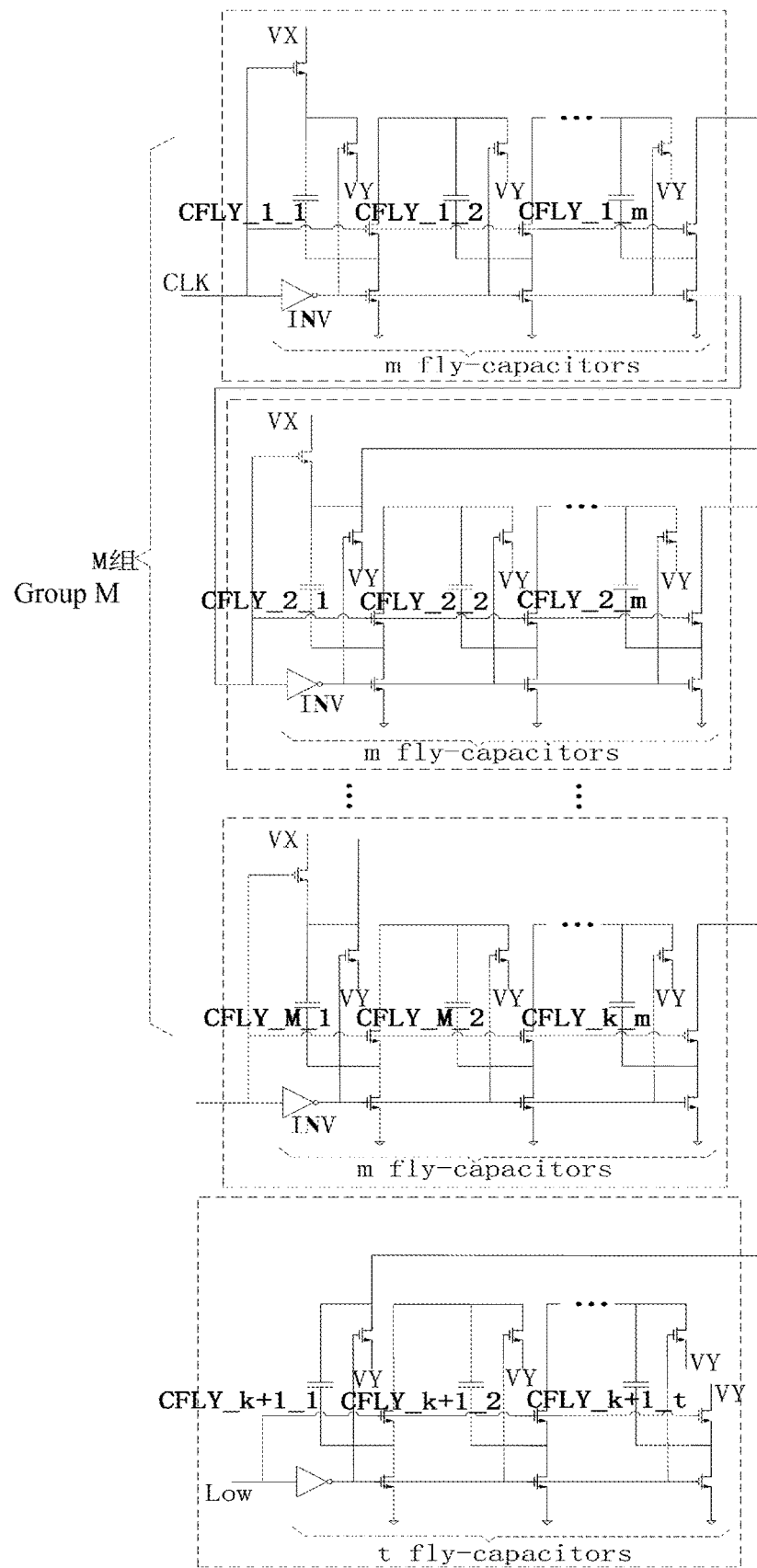
FIG. 7 is a schematic diagram of an overall structure of the high-conversion-efficiency reconfigurable series-parallel switched-capacitor voltage converter provided by the present invention.

According to the present embodiment, the method for solving the 3:1 series-parallel switched-capacitor voltage converter can be generalized to any N:1 series-parallel switched-capacitor voltage converter. As shown in FIG. 7, the N−1 control units of the N:1 series-parallel switched-capacitor voltage converter are divided into k+1 control modules; each one of the preceding k control modules comprises m control units; the last control module, namely the (k+1)-th control module, comprises t control units; the last control module is actually an idle control module. k−1 control switch tubes are added; together with the original control switch tube, the control switch tubes are totally k which respectively correspond to the preceding k control modules; a drain electrode of the i-th control switch tube is connected to the second conversion terminal, namely the VX terminal, of the series-parallel switched-capacitor voltage converter, and a source electrode thereof is connected to an input terminal of a first control unit in a corresponding i-th control module, i being an positive integer and i∈[1, M].

The present invention converts one N:1 series-parallel switched-capacitor voltage converter into k series-parallel switched-capacitor voltage converters, N−1=m×k+t; k(m+1):1 series-parallel switched-capacitor voltage converters form one N:1 series-parallel switched-capacitor voltage converter, m M and t being all non-negative integers. Each N:1 switched-capacitor voltage converter comprises N−1 CFLY capacitors; since N−1=m×k+t, the N−1 CFLY capacitors can be divided into k groups, wherein each group comprises m CFLY capacitors; the m CFLY capacitors in each group can operate according to the (m+1): 1 series-parallel switched-capacitor voltage converter; and the remaining t capacitors are idle, and are connected between the VY and the ground. For a conventional N:1 series-parallel switched-capacitor voltage converter, if the conventional N:1 series-parallel switched-capacitor voltage converter is converted into (m+1): 1 series-parallel switched-capacitor voltage converters to operate, then only m capacitors and relevant power tubes can be utilized, and the other m×(k−1)+t capacitors and relevant power tubes can only be idle and wasted. However, the present invention introduces k−1 additional control switch tubes, such that m×k capacitors and relevant power tubes can be utilized, and only t capacitors and relevant power tubes are idle. If the conventional solution and the solution of the present invention are used to transfer the equal current, then the current flowing through each power tube in the present invention will be 1/k of conventional solution on average. If the switch-on resistance of each power tube is approximately equal, then the heat loss of the solution of the present patent will be approximately 1/k of the conventional solution.

To facilitate understanding, FIGS. 8, 9 and 10 respectively show examples of the switched-capacitor voltage converters when N=4, 5 and 6. The other situations can be obtained on the basis of an N:1 general schematic diagram as shown in FIG. 7.

Figure 8A:
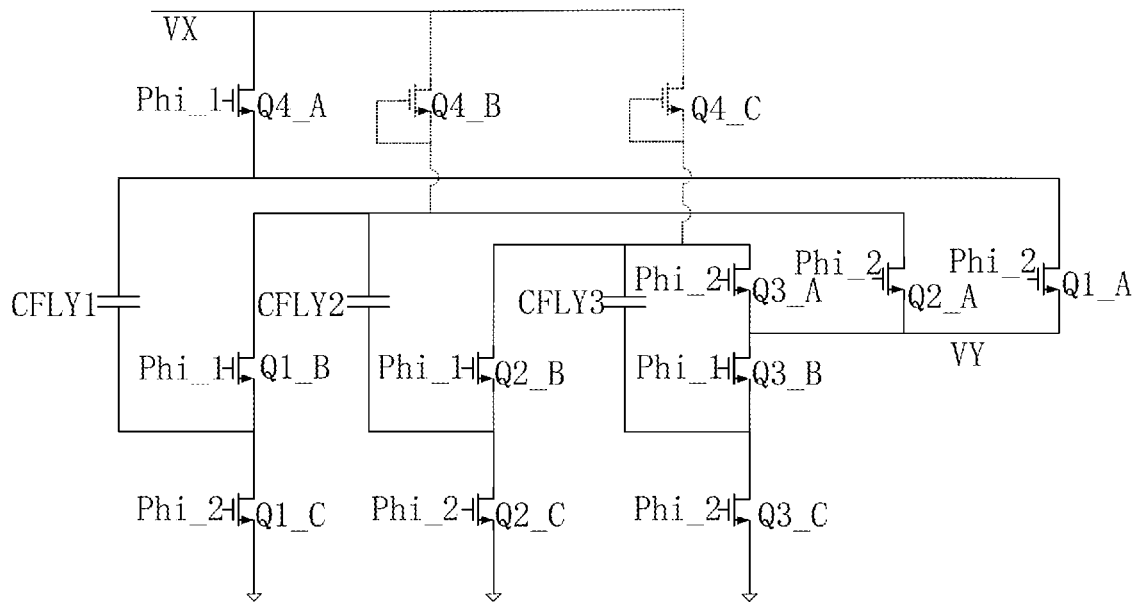
FIGS. 8A, 8B, 8C and 8D are respectively operating principle diagrams when a 4:1 series-parallel switched-capacitor voltage converter provided by the present invention realizes voltage conversion ratios of 4:1, 3:1, 2:1, and 1:1 between the second conversion terminal and the first conversion terminal.
Figure 8B:
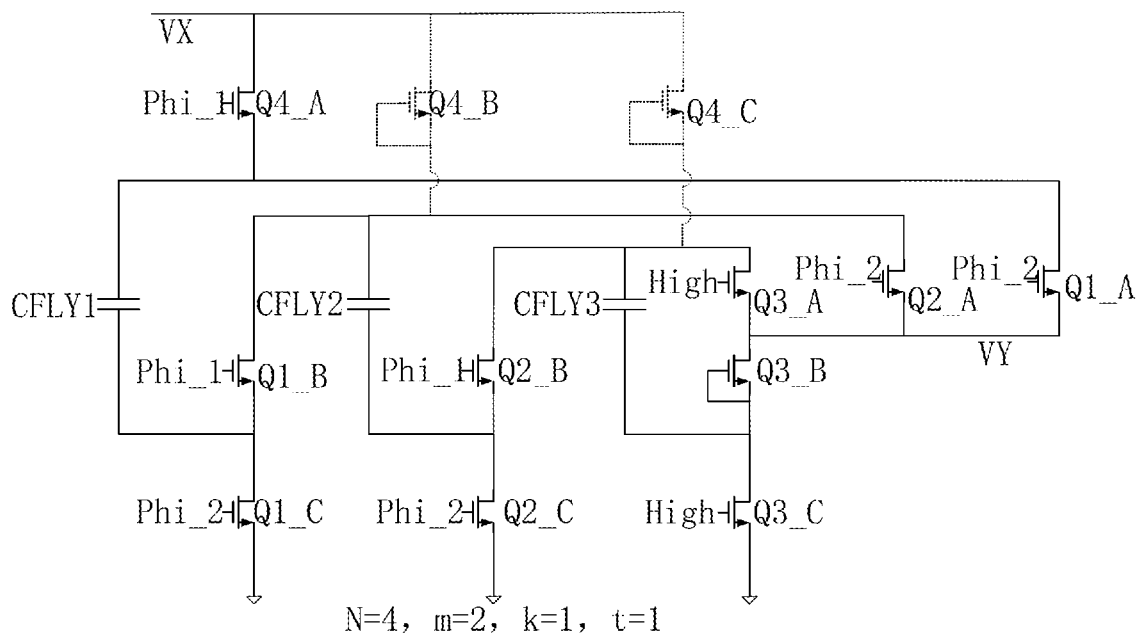

When N=4, FIG. 8A realizes a voltage conversion ratio of 4:1 between the second conversion terminal and the first conversion terminal; Nx=4, and m=Nx−1=3, which denotes that each one of the preceding k control modules comprises three control units; in addition, the condition N−1=m×k+t, namely 3=3×k+t, needs to be satisfied, and k and m can only be both 0 or both positive integers; therefore, k can only be 1, and t is 0; three control units are divided into one control module, and use one control switch tube Q4_A; and the last control module does not comprise control unit. FIG. 8B realizes a voltage conversion ratio of 3:1 between the second conversion terminal and the first conversion terminal; Nx=3, and m=Nx−1=2, which denotes that each one of the preceding k control modules comprises two control units; in addition, the condition N−1=m×k+t, namely 3=2×k+t, needs to be satisfied, and k and m can only be both 0 or both positive integers; therefore, k can only be 1, and t is 0; the first control unit and the second control unit are divided into one control module, and use one control switch tube Q4_A; and the third control unit is divided into the last control module which is idle.

Figure 8C:
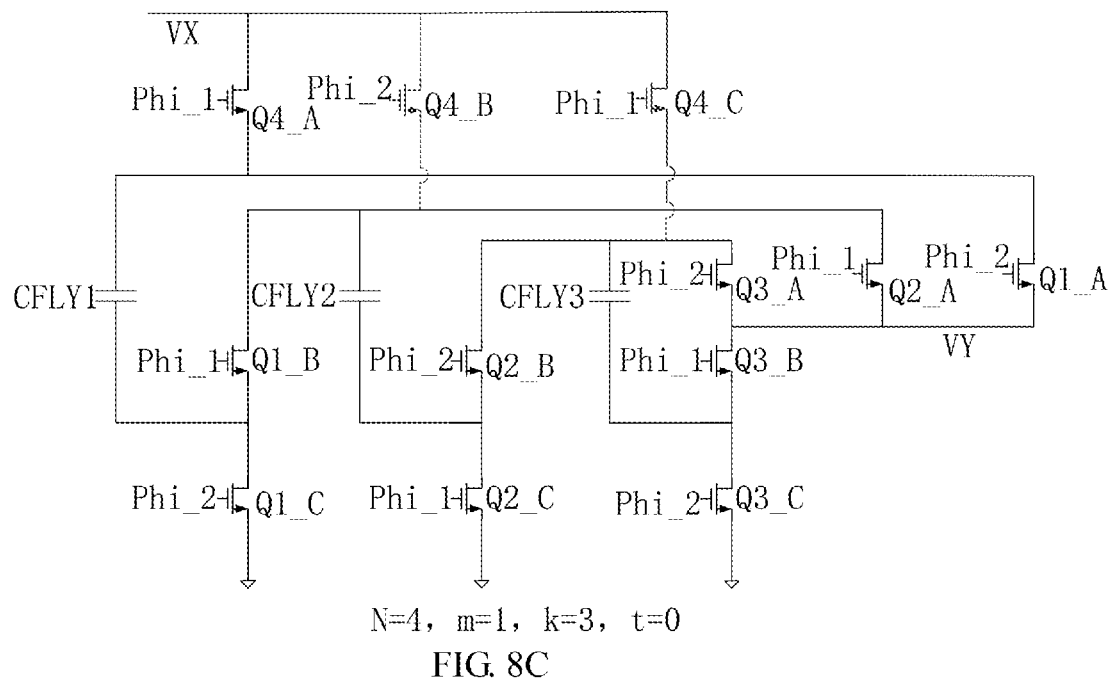
Figure 8D:
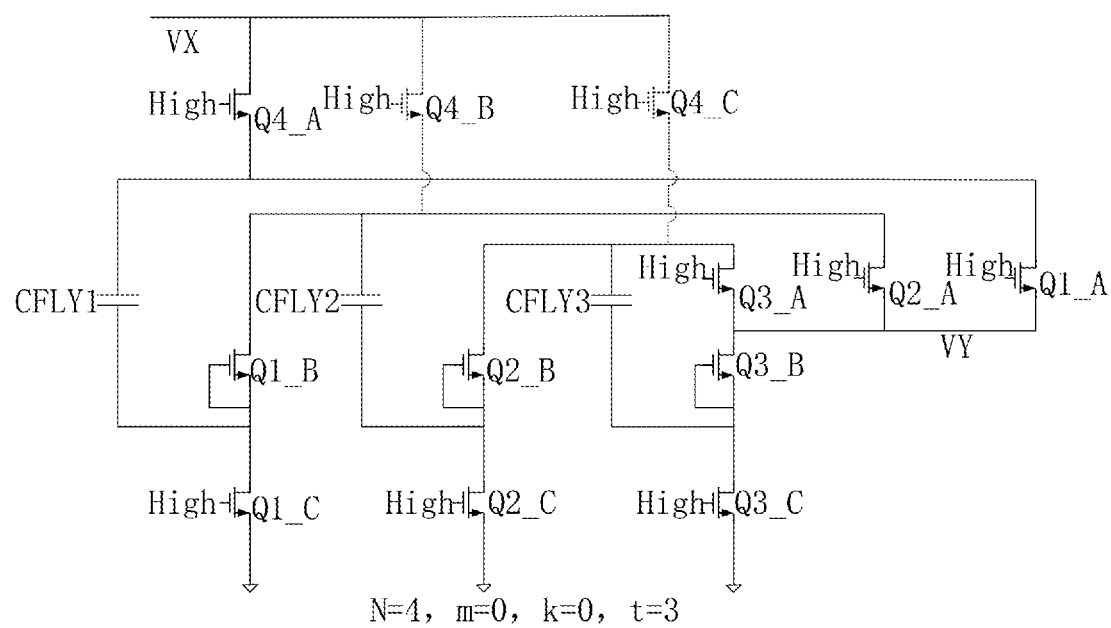

FIG. 8C realizes a voltage conversion ratio of 2:1 between the second conversion terminal and the first conversion terminal; Nx=2, and m=Nx−1=1, which denotes that each one of the preceding k control modules comprises one control unit; in addition, the condition N−1=m×k+t, namely 3=1×k+t, needs to be satisfied, and k and m can only be both 0 or both positive integers; therefore, k can be 1, 2 or 3, and t can be 2, 1 or 0; furthermore, t should be as small as possible; therefore, t=0, k=3; the three control units are respectively divided into three control modules, and correspondingly use three control switch tubes Q4_A, Q4_B, and Q4_C; and the last control module does not comprise control unit. FIG. 8D realizes a voltage conversion ratio of 1:1 between the second conversion terminal and the first conversion terminal; Nx=1, and m=Nx−1=0, which denotes that each one of the preceding k control modules comprises zero control unit; in addition, k and m need to be zero at the same time; therefore, k=; the condition N−1=m×k+t, namely 3=0×0+t; therefore, t=3; the last control module comprises three control units; and the three control switch tubes Q4_A, Q4_B, and Q4_C are all normally open.

Figure 9A:
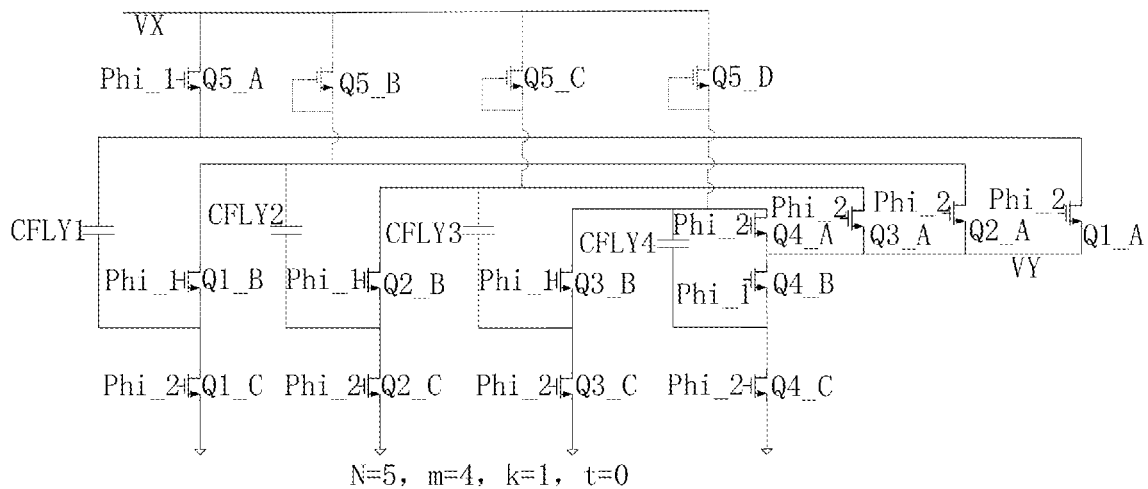
FIGS. 9A, 9B, 9C, 9D and 9E are respectively operating principle diagrams when a 5:1 series-parallel switched-capacitor voltage converter provided by the present invention realizes voltage conversion ratios of 5:1, 4:1, 3:1, 2:1, and 1:1 between the second conversion terminal and the first conversion terminal.
Figure 9B:
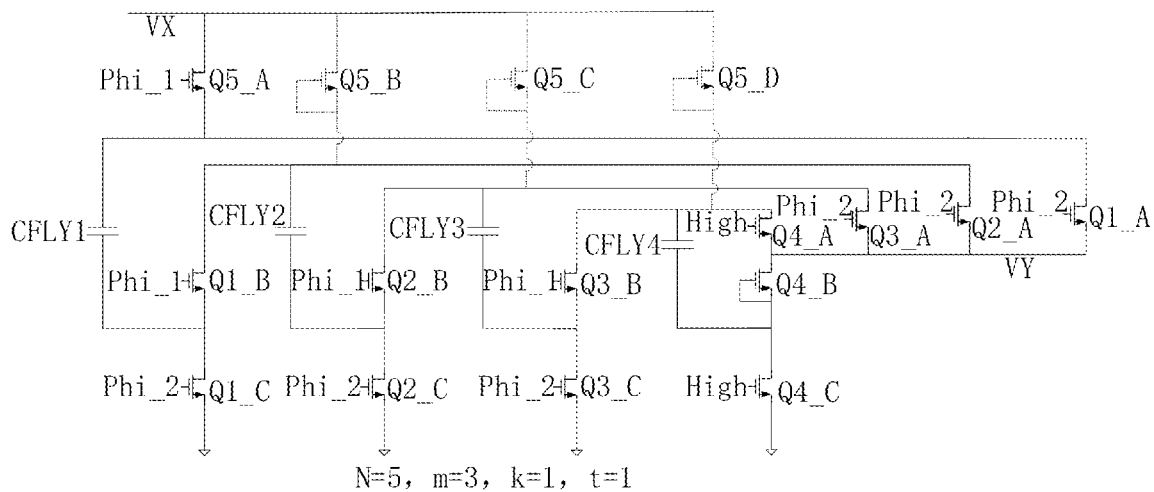
Figure 9C:
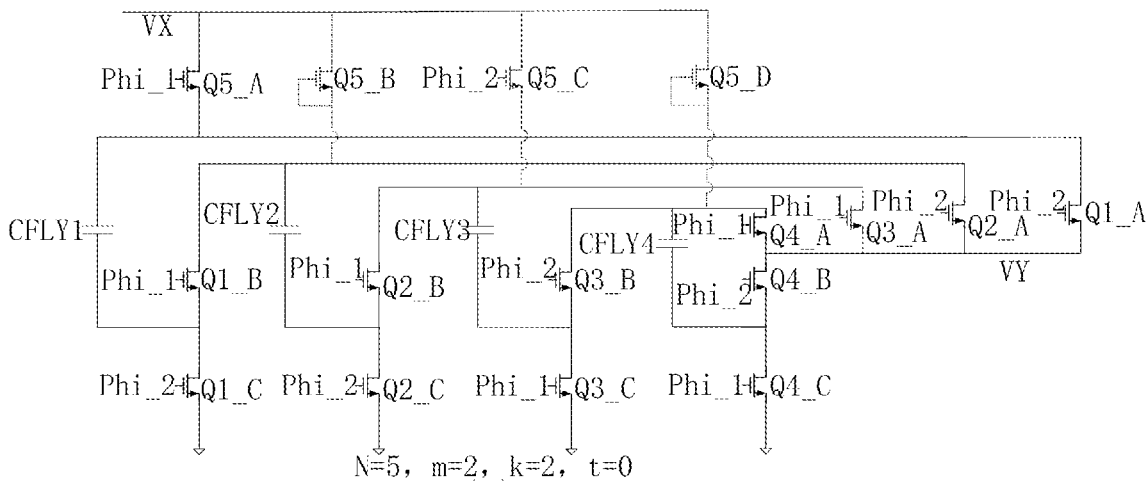
Figure 9D:
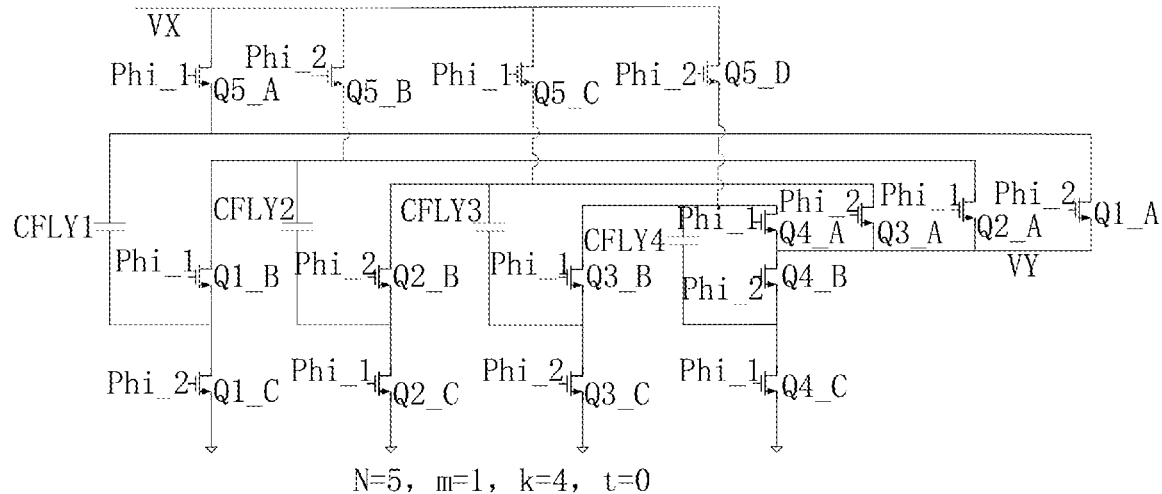
Figure 9E:
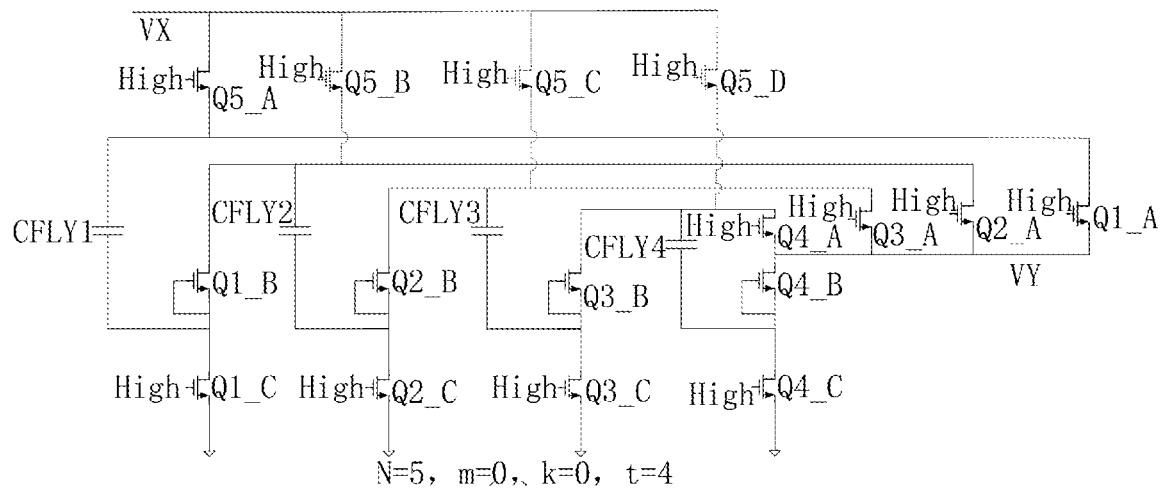
Figure 10A:
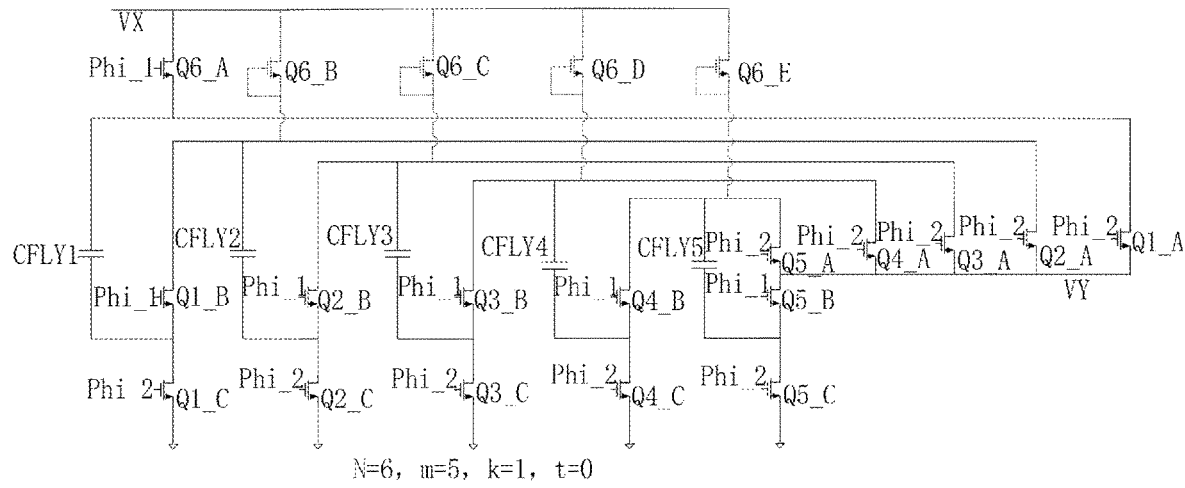
FIGS. 10A, 10B, 10C, OD, 10E and 10F are respectively operating principle diagrams when a 6:1 series-parallel switched-capacitor voltage converter provided by the present invention realizes voltage conversion ratios of 6:1, 5:1, 4:1, 3:1, 2:1, and 1:1 between the second conversion terminal and the first conversion terminal.
Figure 10B:
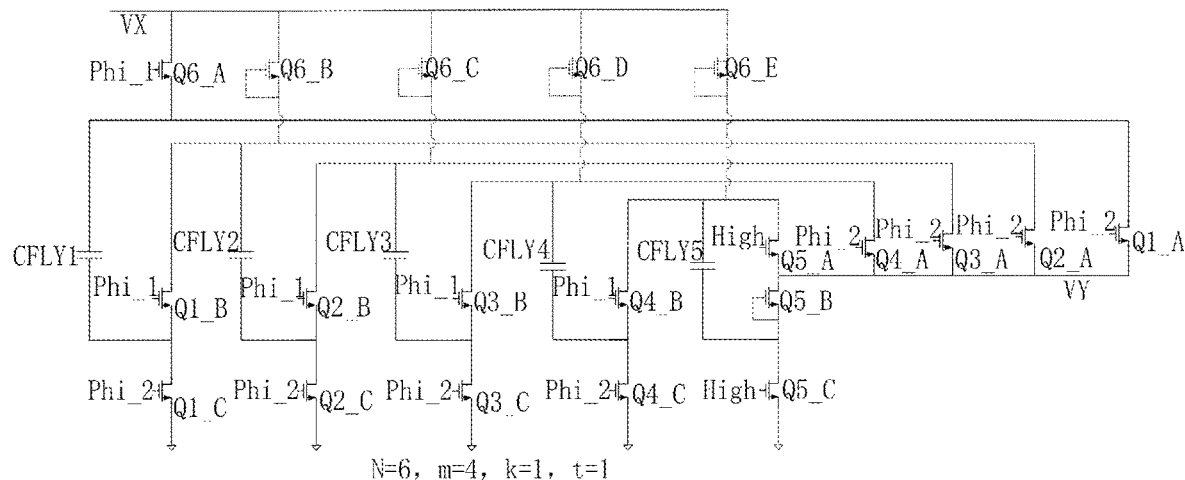
Figure 10C:
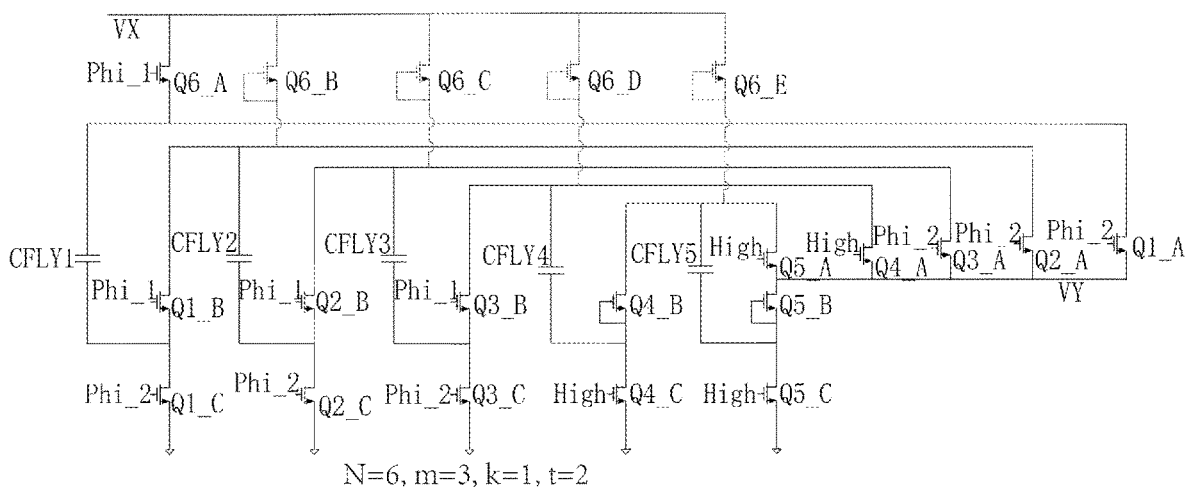
Figure 10D:
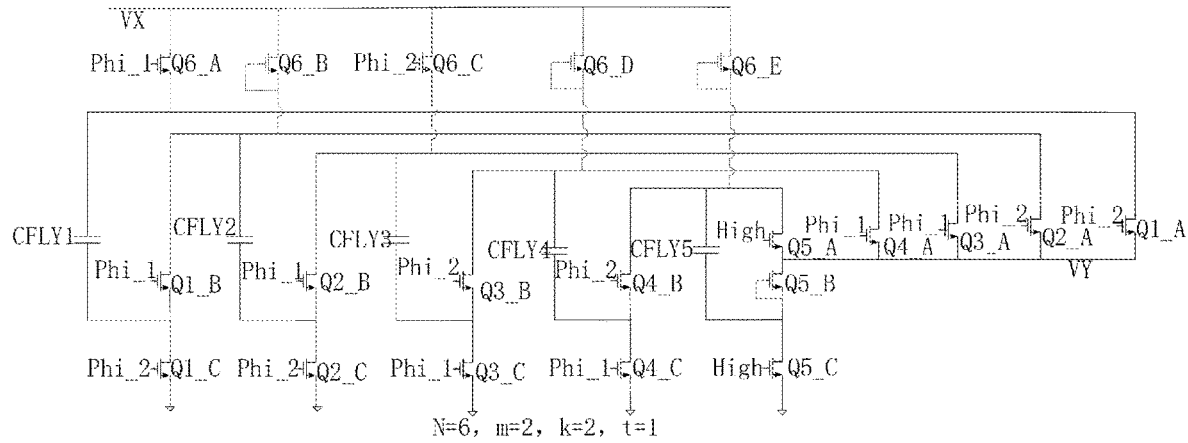
Figure 10E:
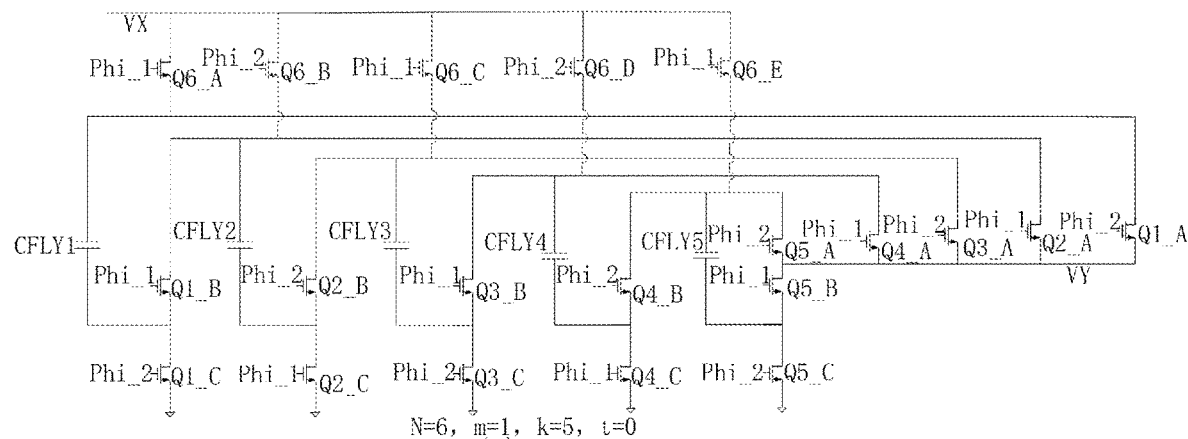
Figure 10F:
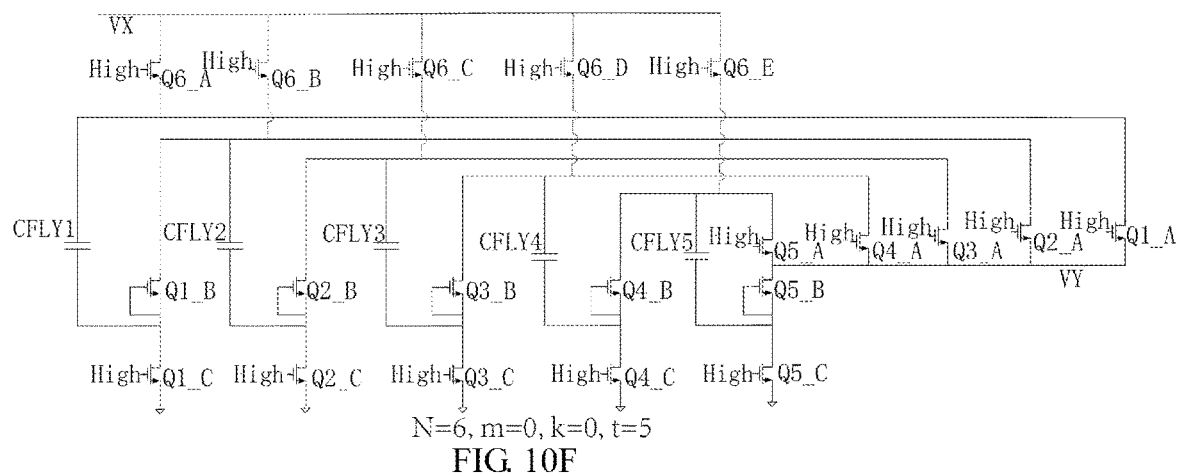

Similarly, when N=5, in FIG. 9A, the voltage conversion ratio between the second conversion terminal and the first conversion terminal is 5:1; Nx=5; m=4; k can only be 1; and t is 0. In FIG. 9B, the voltage conversion ratio between the second conversion terminal and the first conversion terminal is 4:1; Nx=4; m=3; k similarly can only be 1; and t is 1. In FIG. 9C, the voltage conversion ratio between the second conversion terminal and the first conversion terminal is 3:1; Nx=3; m=2; k can be 1 or 2; and t is 2 or 0; t should be as small as possible; therefore, t=0, k=2. In FIG. 9D, the voltage conversion ratio between the second conversion terminal and the first conversion terminal is 3:1; Nx=2; m=1; k can be 1, 2, 3 or 4; and t is correspondingly 3, 2, 1 or 0; t should be as small as possible; therefore, t=0, k=4. In FIG. 9E, the voltage conversion ratio between the second conversion terminal and the first conversion terminal is 1:1; Nx=1; m=0; k and m are both 0; and t is 4. When N=6, the 6:1 switched-capacitor voltage converter provided by the present invention is utilized to realize voltage conversion ratios of 6:1, 5:1, 4:1, 3:1, 2:1, and 1:1 respectively between the second conversion terminal and the first conversion terminal, as shown in FIGS. 10A, 10B, 10C, 10D, 10E and 10F.

Two use scenarios of the reconfigurable series-parallel switched-capacitor voltage converter provided by the present invention are given hereafter.

Figure 11:
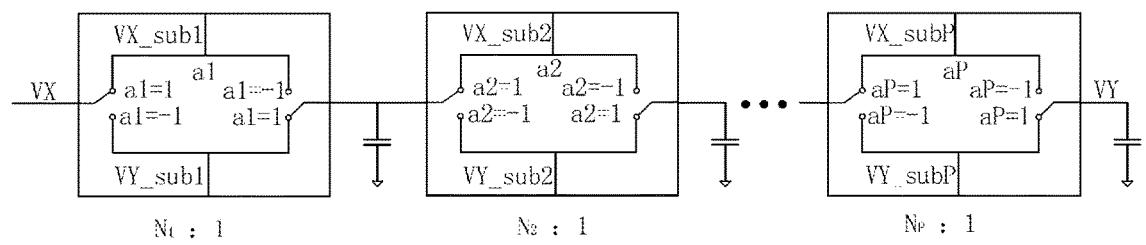
FIG. 11 is a structural schematic diagram when P series-parallel switched-capacitor voltage converter provided by the present invention are cascaded.

A first use of the present invention:

If a higher order switched-capacitor voltage converter is required, then P N:1 switched-capacitor voltage converters provided by the present invention can be cascaded as sub-switched-capacitor voltage converters to form a cascaded master switched-capacitor voltage converter. FIG. 11 shows a concatenation solution. P series-parallel switched-capacitor voltage converters are respectively an $N_1$:1 series-parallel switched-capacitor voltage converter, an $N_2$: 1 series-parallel switched-capacitor voltage converter, . . . , and an $N_p$: 1 series-parallel switched-capacitor voltage converter; the $N_p$: 1 series-parallel switched-capacitor voltage converter comprises $N_p$:1 control units; the concatenation solution can realize voltage conversion ratios of 1:1 to $N_p$:1, p being a positive integer and p∈[1, P], and P being a positive integer greater than 1. The P series-parallel switched-capacitor voltage converters can select the voltage conversion ratios thereof at will, for example, the voltage conversion ratio between the second conversion terminal and the first conversion terminal of the first sub-switched-capacitor voltage converter is selected to be $L_1$:1, the voltage conversion ratio between the second conversion terminal and the second conversion terminal of the first sub-switched-capacitor voltage converter is selected to be $L_2$:1, ..., and the voltage conversion ratio between the second conversion terminal and the first conversion terminal of the P-th sub-switched-capacitor voltage converter is selected to be L:1, $L_1$∈[1,$N_1$], $L_2$∈[1,$N_2$], ..., and $L_p$∈[1,$N_p$]. Therefore, any Np:1 series-parallel switched-capacitor voltage converter can be converted into a $VX_{subP}$:$VY_{subP}$=$L_p$:1 switched-capacitor voltage converter, $L_p$∈[1,$N_p$].

P series-parallel switched-capacitor voltage converters provided by the present invention are cascaded as sub-switched-capacitor voltage converters; each sub-switched-capacitor voltage converter is independent; as shown by the switched-capacitor voltage converters in FIG. 7, the independence contains two aspects: (1) the conversion ratio of each sub-switched-capacitor voltage converter is independent, and does not need to be the same; and (2) any one sub-switched-capacitor voltage converter can treat the first conversion terminal as an input terminal, and the second conversion terminal as an output terminal; alternatively, any one sub-switched-capacitor voltage converter can treat the second conversion terminal as an input terminal, and the first conversion terminal as an output terminal. Furthermore, the configurations of the input terminals and the output terminals of the sub-switched-capacitor voltage converters can be nonuniform, for example, the first sub-switched-capacitor voltage converter can treat the first conversion terminal as an input terminal, and the second conversion terminal as an output terminal; and the second sub-switched-capacitor voltage converter can treat the second conversion terminal as an input terminal, and the first conversion terminal as an output terminal, . . . .

The voltage conversion ratio between the output terminal and the input terminal of the p-th sub-switched-capacitor voltage converter is set to be $L_p^{a_p}$:1; when $L_p^{a_p}$, the p-th sub-switched-capacitor voltage converter treats the first conversion terminal as an input terminal, and the second conversion terminal as an output terminal; the p-th sub-switched-capacitor voltage converter is used to improve a voltage at the input terminal thereof by $L_p$ times, and then output the voltage; and when $a_p$=−1, the p-th sub-switched-capacitor voltage converter treats the second conversion terminal as an input terminal, and the first conversion terminal as an output terminal; the p-th sub-switched-capacitor voltage converter is used to reduce the voltage at the input terminal thereof by $1/L_p$ times, and then output the voltage. Therefore, the voltage conversion ratio between the output terminal and the input terminal of the cascaded master switched-capacitor voltage converter formed by cascading P sub-switched-capacitor voltage converters is L:1, $L=L_1^{a_1} \times L_2^{a_2} \times \ldots \times L_P^{a_P}$.

Figure 12:
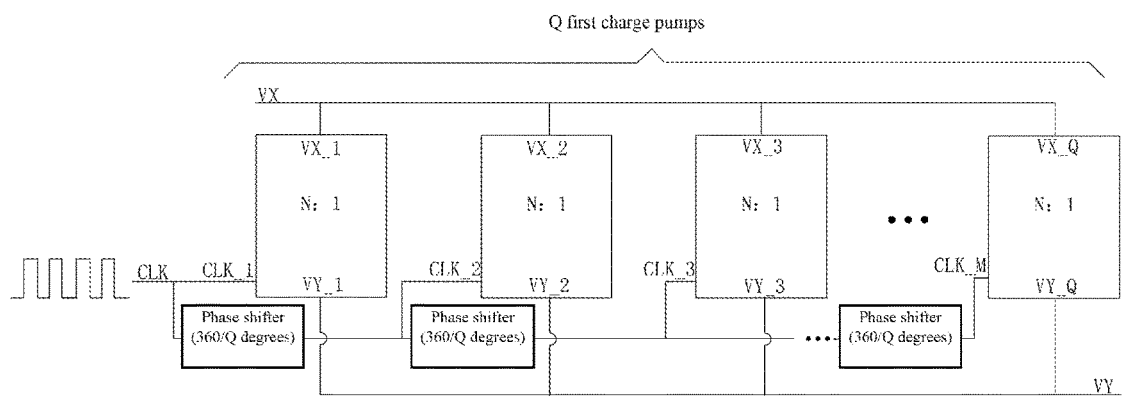
FIG. 12 is a structural schematic diagram when Q first switched-capacitor voltage converter are used in parallel connection.

A second use of the present invention:

For the N:1 series-parallel switched-capacitor voltage converters, in order to reduce the current ripples at the VX terminal and the VY terminal or improve current capability, generally two or more N:1 series-parallel switched-capacitor voltage converters are connected in parallel with the phases interleaved. The current of the switched-capacitor voltage converter follows a resistor and capacitor charging and discharging exponential curve. Therefore, the current is nonuniform in each period. In order to smooth the overall input and output current, generally a plurality of switched-capacitor voltage converters are connected in parallel with the phases interleaved. Occasionally, the system desires to improve the current capability; a plurality of switched-capacitor voltage converters are also connected in parallel, as shown in FIG. 12. In FIG. 12, Q first switched-capacitor voltage converters having the same conversion ratio (N:1) are connected in parallel. However, the phases the clock signals CLK thereof are interleaved by 360°/Q, wherein the first switched-capacitor voltage converter can separately adopt the N:1 series-parallel switched-capacitor voltage converter provided by the present invention, and can also adopt the N:1 cascaded master switched-capacitor voltage converter obtained by cascading a plurality of series-parallel switched-capacitor voltage converters. Similarly, the first switched-capacitor voltage converters connected in parallel can also change the voltage conversion ratios thereof according to the solution of the present invention.

In summary, the embodiment of the present invention provides a solution of adding a control switch tube in the conventional 3:1 series-parallel switched-capacitor voltage converter and interleaving phases, and solves the problem of low operating efficiency under the voltage conversion ratio 2:1 in the conventional 3:1 series-parallel switched-capacitor voltage converter. Furthermore, the method for solving the low efficiency problem of the 3:1 series-parallel switched-capacitor voltage converter is generalized to any N:1 series-parallel switched-capacitor voltage converter. The N:1 series-parallel switched-capacitor voltage converter comprises N−1 control units, namely N−1 CFLY capacitors, wherein the N−1 control units are divided into k+1 control modules; each one of the preceding k control modules comprises m control units; and the last control module comprises t control units. One N:1 series-parallel switched-capacitor voltage converter can be converted into k (m+1):1 series-parallel switched-capacitor voltage converters; only t CFLY capacitors are idle. Therefore, the present invention utilizes each device in a circuit to the most extent, improves the voltage conversion efficiency, and reduces the heat loss. In addition, the present invention further provides a solution of cascading the series-parallel switched-capacitor voltage converters of the present invention, and provides a use mode of connecting the series-parallel switched-capacitor voltage converter of the present invention to the cascaded master switched-capacitor voltage converter with the phases interleaved, thus reducing the current ripples at the VX and VY terminals, improving the current capability, and improving the design flexibility.

A person skilled in the art should realize that the above embodiments are provided to help a reader understand the principle of the present invention, and it should be understood that the protection scope of the present invention is not limited to such specific statement and embodiments. A person skilled in the art could make other various specific variations and combinations according to the technical motivations disclosed by the present invention without departing from the essence of the present invention, and the variations and the combinations are still concluded in the protection scope of the present invention.

The invention claimed is:

1. A high-conversion-efficiency reconfigurable series-parallel switched-capacitor voltage converter, comprising N−1 control units and a control switch tube, wherein N being a positive integer greater than 1;

a j-th control unit comprises a capacitor, a first NMOS transistor, a second NMOS transistor, and a third NMOS transistor, j being a positive integer and j∈[1, N−1];

a drain electrode of the first NMOS transistor is connected to a first terminal of the capacitor, and acts as an input terminal of the j-th control unit; and a source electrode of the first NMOS transistor is connected to a first conversion terminal of the high-conversion-efficiency reconfigurable series-parallel switched-capacitor voltage converter;

a drain electrode of the second NMOS transistor is connected to an input terminal of a (j+1)-th control unit, and a source electrode of the second NMOS transistor is connected to a drain electrode of the third NMOS transistor and a second terminal of the capacitor; a source electrode of the third NMOS transistor is connected to a reference ground;

the drain electrode of the second NMOS transistor of a (N−1)-th control unit is connected to the first conversion terminal of the high-conversion-efficiency reconfigurable series-parallel switched-capacitor voltage converter, wherein, the N−1 control units are divided into k+1 control modules, wherein k is a positive integer not greater than N−1; each one of preceding k control modules comprises m control units, and a last control module comprises t control units, k, m and t being all non-negative integers;

the high-conversion-efficiency reconfigurable series-parallel switched-capacitor voltage converter further comprises k−1 control switch tubes; k control switch tubes respectively correspond to the preceding k control modules, wherein a drain electrode of an i-th control switch tube is connected to a second conversion terminal of the high-conversion-efficiency reconfigurable series-parallel switched-capacitor voltage converter, and a source electrode of the i-th control switch tube is connected to an input terminal of a first control unit in a corresponding i-th control module, i being an positive integer and i∈[1,M];

a gate electrode of the i-th control switch tube and a gate electrode of the second NMOS transistor in the corresponding i-th control module are connected to a clock signal of the i-th control module; a plurality of gate electrodes of the first NMOS transistor and the third NMOS transistor in the i-th control module are connected to a reverse-phase signal of the clock signal of the i-th control module;

the clock signal of the i-th control module and the clock signal of the (i+)-th control module are a plurality of reverse-phase signals; the clock signal of a first control module is the clock signal of the high-conversion-efficiency reconfigurable series-parallel switched-capacitor voltage converter;

the gate electrode of the second NMOS transistor in the last control module is connected to a low level; the plurality of gate electrodes of the first NMOS transistor and the third NMOS transistor in the last control module are connected to a high level;

the high-conversion-efficiency reconfigurable series-parallel switched-capacitor voltage converter realizes a voltage conversion ratio in a range from 1:1 to N:1 between the second conversion terminal and the first conversion terminal; and when the voltage conversion ratio between the first conversion terminal and the second conversion terminal of the high-conversion-efficiency reconfigurable series-parallel switched-capacitor voltage converter is Nx:1, Nx is a positive integer and Nx∈[1, N]; m=Nx−1; k and t satisfy N−1=m×k+t; k and m are both 0 or are both positive integers; and t is as small as possible.

2. The high-conversion-efficiency reconfigurable series-parallel switched-capacitor voltage converter according to claim 1, wherein P reconfigurable series-parallel switched-capacitor voltage converters are cascaded to form a cascaded master switched-capacitor voltage converter, wherein P being a positive integer greater than 1; each cascaded reconfigurable series-parallel switched-capacitor voltage converter of the P reconfigurable series-parallel switched-capacitor voltage converters acts as a sub-switched-capacitor voltage converter; an input terminal of a p-th sub-switched-capacitor voltage converter is connected to an output terminal of a (p−1)-th sub-charge pump; an input terminal of a first sub-switched-capacitor voltage converter acts as an input terminal of the cascaded master switched-capacitor voltage converter; an output terminal of the p-th sub-switched-capacitor voltage converter acts as an output terminal of the cascaded master switched-capacitor voltage converter; p is a positive integer and p∈[1,P];

the p-th sub-switched-capacitor voltage converter comprises Np−1 control units, Np being a positive integer greater than 1; the voltage conversion ratio between the output terminal and the input terminal of the p-th sub-switched-capacitor voltage converter is $L_p^{a_p}:1$, $L_p \in [1,N_p]$; when the p-th sub-switched-capacitor voltage converter treats the first conversion terminal as an input terminal, and treats the second conversion terminal as an output terminal, $a_p=1$; when the p-th sub-switched-capacitor voltage converter treats the second conversion terminal as an input terminal, and treats the first conversion terminal as an output terminal, $a_p=-1$; and the voltage conversion ratio between the output terminal and the input terminal of the cascaded master switched-capacitor voltage converter is L:1, $L=L_1^{a_1} \times L_2^{a_2} \times \ldots \times L_P^{a_P}$.

3. The high-conversion-efficiency reconfigurable series-parallel switched-capacitor voltage converter according to claim 2, wherein Q first switched-capacitor voltage converters having a same voltage conversion ratio are used in a parallel connection; clock signals of two adjacent Q first switched-capacitor voltage converters have a phase difference of 360°/Q; and each first switched-capacitor voltage converter of the q first switched-capacitor voltage converters selects to adopt the high-conversion-efficiency reconfigurable series-parallel switched-capacitor voltage converter or the cascaded master switched-capacitor voltage converter.

4. The high-conversion-efficiency reconfigurable series-parallel switched-capacitor voltage converter with according to claim 1, wherein the clock signal of the series-parallel switched-capacitor voltage converter is a square wave signal with a 50% duty ratio.

5. The high-conversion-efficiency reconfigurable series-parallel switched-capacitor voltage converter with according to claim 2, wherein the clock signal of the series-parallel switched-capacitor voltage converter is a square wave signal with a 50% duty ratio.

6. The high-conversion-efficiency reconfigurable series-parallel switched-capacitor voltage converter with according to claim 3, wherein the clock signal of the series-parallel switched-capacitor voltage converter is a square wave signal with a 50% duty ratio.

* * * * *